No. 668,344. Patented Feb. 19, 1901.
W. W. WILSON.
FILTER BED.
(Application filed Mar. 17, 1900.)
(No Model.)

WITNESSES
Luitgard Morba
Edward M. Yeomans

INVENTOR
William W. Wilson
By W. E. Simonds
Atty

UNITED STATES PATENT OFFICE.

WILLIAM W. WILSON, OF HOLYOKE, MASSACHUSETTS.

FILTER-BED.

SPECIFICATION forming part of Letters Patent No. 668,344, dated February 19, 1901.

Application filed March 17, 1900. Serial No. 9,131. (No model.)

*To all whom it may concern:*

Be it known that I, WILLIAM W. WILSON, a citizen of the United States of America, residing at Holyoke, in the county of Hampden and State of Massachusetts, have invented a certain new and useful Improvement in Filter-Beds, of which the following is a description, reference being had to the accompanying drawings, wherein—

Figure 1:
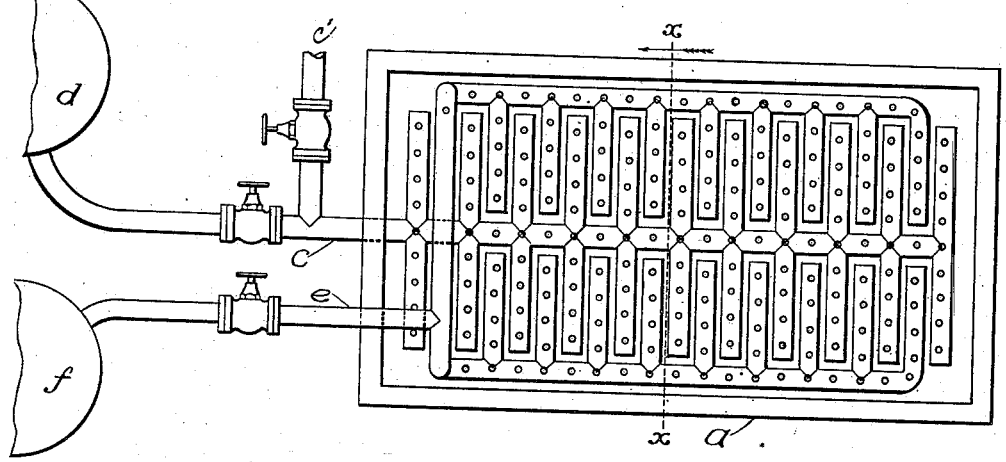
Figure 2:
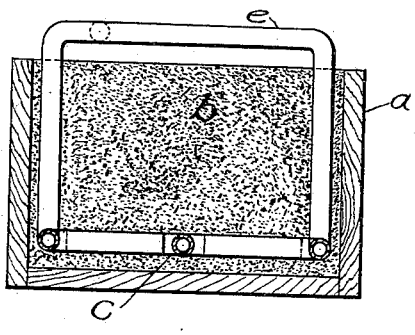

Figure 1 is a plan view of a filter-case with the filter-bed absent therefrom, but otherwise embodying the said improvement. Fig. 2 is a view of what is shown in Fig. 1 in central vertical section on the plane denoted by the dotted line $x\,x$, including the filter-bed.

The object of the improvement is the production of a filter-bed having means of novelty and advantage for washing the filter-bed.

In the accompanying drawings the letter $a$ denotes what may be called the "filter-case," it being a box or case of any suitable material for containing the filter-bed.

The letter $b$ denotes the filter-bed, which may be of sand or other suitable filter material.

The letter $c$ denotes a water-pipe provided with radial branches located near the bottom of the filter-bed. The branches are provided with perforations, and it is practicable to similarly perforate the water-pipe itself so far as it is contained within the filter-case. For the washing purposes already indicated the water-pipe is connected to a suitable water source, as $d$.

The letter $e$ denotes an air-pipe which is provided with branches alternating in position with branches of the water-pipe $c$. These branches are perforated, and it is practicable to perforate the air-pipe itself so far as it is located within the filter-case. This air-pipe is connected to a source of air under pressure—as, for instance, $f$.

In the practical use of this filtering apparatus while filtering is going on the water to be filtered is delivered upon the top of the filter-bed from a common water-pipe and is filtered by passing through the filter-bed, and the filtered water escapes through the water-pipe $c'$. All that is old so far as the present improvement is concerned. In the practice of the present improvement for the purpose of washing the filter-bed the course of the water is reversed and water is forced in through the pipe $c$ and rises through the filter-bed to the top, there flowing off with the matter it has taken up. At the same time air is forced into the air-pipe under pressure and escapes into the filter-bed through the perforations thereof and through the perforations of the branches thereof. The air and the water thus passing together through the filter-bed from below upward thoroughly agitate the whole filter-bed and move its particles about while the washing is going on, so that the water effects its cleansing function altogether more thoroughly than it would except for the presence of the currents of air under pressure.

I claim as my improvement—

In combination; the filter-case; the filter-bed; the water-pipe leading from a suitable water source into the filter-bed near the bottom thereof and there provided with perforated branches; and the air-pipe leading from an air-pressure source into the filter-bed near the bottom thereof and there provided with perforated branches alternating in position with the said branches of said water-pipe; all substantially as described and for the purposes set forth.

WM. W. WILSON.

Witnesses:
 W. E. SIMOND,
 LUITGARD MORBA.